US010168534B2

(12) United States Patent
Callier et al.

(10) Patent No.: US 10,168,534 B2
(45) Date of Patent: Jan. 1, 2019

(54) METHODS AND SYSTEMS FOR AUGMENTED REALITY (71) Applicant: Essilor International, Charenton-le-Pont (FR)

(72) Inventors: Benoit Callier, Charenton-le-Pont (FR); Coralie Barrau, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 3 days.

(21) Appl. No.: 15/128,865

(22) PCT Filed: Mar. 19, 2015

(86) PCT No.: PCT/EP2015/055822
§ 371 (c)(1),
(2) Date: Sep. 23, 2016

(87) PCT Pub. No.: WO2015/144565
PCT Pub. Date: Oct. 1, 2015

(65) Prior Publication Data
US 2017/0153454 A1   Jun. 1, 2017

(30) Foreign Application Priority Data

Mar. 26, 2014 (EP) .................................... 14305432

(51) Int. Cl.
*G02B 27/14* (2006.01)
*G02B 27/01* (2006.01)
(Continued)

(52) U.S. Cl.
CPC .......... *G02B 27/0172* (2013.01); *G02B 5/22* (2013.01); *G02B 5/28* (2013.01); *G02B 2027/0174* (2013.01); *G02B 2027/0178* (2013.01)

(58) Field of Classification Search
CPC ........ G02B 5/20; G02B 27/017; G02B 27/01; G02B 27/283; G02B 2027/0132;
(Continued)

(56) References Cited

U.S. PATENT DOCUMENTS 4,942,102 A    7/1990  Keys et al.
6,140,980 A *  10/2000 Spitzer .................. A61B 3/113
                                                   257/E21.614
(Continued)

FOREIGN PATENT DOCUMENTS

EP     0506560 A2   9/1992
EP     1203980 A1   5/2002
(Continued)

OTHER PUBLICATIONS

Stephen A. Benton and V. Michael Bove, "Holographic Imaging", Wiley Interscience, 2008.
(Continued)

*Primary Examiner* — Mahidere S Sahle
(74) *Attorney, Agent, or Firm* — Oblon, McClelland, Maier & Neustadt, L.L.P.

(57) ABSTRACT

The invention relates to methods and systems for augmented reality. The invention more particularly provides head-mounted devices for the display and visualization of computer-generated information content by a wearer. The invention further provides related methods and uses.

12 Claims, 4 Drawing Sheets (51) Int. Cl.
*G02B 5/22* (2006.01)
*G02B 5/28* (2006.01)

(58) Field of Classification Search
CPC .... G02B 2027/0178; G02B 2027/0112; H04N 5/7491; H04N 13/044
USPC ............................ 345/7–9; 359/13, 630, 632
See application file for complete search history.

(56) References Cited

U.S. PATENT DOCUMENTS

| | | | |
|---|---|---|---|
| 8,534,833 B2 | 9/2013 | Cado et al. | |
| 2002/0113937 A1 | 8/2002 | Ouderkirk et al. | |
| 2006/0152782 A1* | 7/2006 | Noda | G02B 27/0103 359/13 |
| 2011/0096100 A1* | 4/2011 | Sprague | G02B 27/286 345/690 |
| 2011/0221656 A1 | 9/2011 | Haddick et al. | |
| 2013/0187091 A1 | 7/2013 | Zheng | |

FOREIGN PATENT DOCUMENTS

| | | | |
|---|---|---|---|
| EP | 1544661 A1 | 6/2005 | |
| GB | 2278693 A | 12/1994 | |
| WO | 93/18428 A2 | 9/1993 | |
| WO | 98/15868 A1 | 4/1998 | |
| WO | 2014/024764 A1 | 2/2014 | |

OTHER PUBLICATIONS

C.M. Soukoulis, "Photonic Band Gap Materials", Series: Nato Science Series E:, vol. 315.

Masuda H., et al.; "Photonic Band Gap in Anodic Porous Alumina with Extremely High Aspect Ration Formed in Phosphoric Acid Solution"; Japanese Journal of Applied Physics, Japan Society of Applied Physics; Oct. 15, 2000; vol. 39, No. 10B, Part 02; pp. L1039-L1041.

Harper, W.J.; "Voltage Effects in Cholesteric Liquid Crystals"; Molecular Materials, Gordon and Breach-Harwood Academic, CH; vol. 1, Jan. 1, 1966; pp. 325-332.

Zhou, M., et al; "Fabrication of two-dimensional infrared photonic crystals by deep reactive ion etching on Si wafter and their optical properties"; Solid State Communications, Pergamon, GB.; vol. 32, No. 8; Sep. 28, 2004; pp. 503-506.

Clays, K. et al.; "Purple membrane suspensions: A natural random nonlinear photonic bandgap material"; Nonlineral Optics: Materials, Fundamentals, and Applications, 2000. Techincal Digest, IEEE; Aug. 6, 2000; pp. 7-9.

Ffrederic Kahn; "Electric-Filed-Induced Color Changes and Pitch Dilation in Cholesteric Liquid Crystals"; Physical Review Letters; vol. 24, No. 5; Feb. 2, 1970; pp. 20-212.

Andre C. Arsenault, et al.; "Photonic-crystal full-colour displays" Nature Photonics, Nature Publishing Group, UK.; vol. 1, No. 8; Aug. 1, 2007; pp. 468-472.

* cited by examiner

METHODS AND SYSTEMS FOR AUGMENTED REALITY

FIELD OF THE INVENTION

The invention relates to methods and systems for augmented reality.

The invention more particularly provides head-mounted devices for the display and visualization of computer-generated information content by a wearer. The invention further provides related methods and uses.

BACKGROUND OF THE INVENTION

Head-mounted devices with display features are known in the art. Such head-mounted display devices (HMDs) include so-called 'smart glasses', which allow the wearer thereof to visualize information such as images or text for augmented reality.

Such devices raise issues of confidentiality of the information content displayed by the HMD. This is because persons other than the wearer may be in a position to view the information content displayed. Further, for aesthetic reasons, it is desirable that the HMD is designed in such a way that the display system is at least partially hidden from the view of an outside observer.

It is however required, for see-through HMDs, that the wearer still be able to view the 'real' world, so that the HMD should retain suitable transparency for see-through viewing by the wearer.

SUMMARY OF THE INVENTION

The present invention generally provides head-mounted devices for the display and visualization of computer-generated information content by a wearer. The invention further provides related methods and uses.

Devices

According to one aspect, the present invention provides a see-through head-mounted device for a wearer, comprising
  a display system for the display and visualization of computer-generated information content by the wearer, and
  a see-through element intended to be positioned in front of one or both eyes of the wearer, through which the wearer can visualize a visual field from the environment of the wearer,
  wherein the see-through element comprises selective optical filtering means configured to at least partially hide said display system and/or the information content displayed by said display system from the view of an outside observer, while retaining see-through properties for the wearer's visual field.

In some embodiments, the selective optical filtering means are configured to at least partially hide said display system from the view of an outside observer, while retaining see-through properties for the wearer's visual field, and preferably the selective optical filtering means are capable of selectively reflecting incident light stemming from the wearer's environment, for example natural or artificial light.

In some embodiments, the selective optical filtering means comprise a high-reflection coating capable of selectively reflecting at least one of the wavelengths that, in the absence of said coating, render the display system visible from the point of view of an outside observer.

In some embodiments, the coating is selected from one-way mirrors, dielectric mirrors, holographic gratings, photonic bandgap structures, thick film layers, thin film layers, cholesteric liquid crystals and any combinations of one or several of them.

In some embodiments, the selective optical filtering means are configured to at least partially hide the information content displayed by said display system from the view of an outside observer, while retaining see-through properties for the wearer's visual field, and preferably the selective optical filtering means comprise an optical filter that blocks at least one wavelength of the emission spectrum of the light source of the display system.

In some embodiments, the selective optical filtering means comprise means selected from absorption and interference filters.

In some embodiments, the selective optical filtering means are capable of conferring a specific color to the see-though element, when visualized from the point of view of an outside observer.

In some embodiments, the selective optical filtering means are selectively provided for a specific surface area of the see-through element, for example according to spatial gradients, according to the location of the display system relative to the see-through element, and/or according to the incident light stemming from the wearer's environment.

In some embodiments, the selective optical filtering means are activable.

In some embodiments, the selective optical filtering means are spectrally controllable, preferably the selective optical filtering means are controlled by a synchronization with the emission spectrum of the light source of the display system.

In some embodiments, the see-through head-mounted device is a pair of eyeglasses, the see-through element comprises a pair of ophthalmic lenses, and the selective optical filtering means are provided for one or both of the lenses, and/or the display system comprises a case (pod) and a light-guide optical element embedded into one of the lenses, preferably the display system is for monocular display.

In some embodiments, the see-through head-mounted device is a pair of eyeglasses, wherein the see-through element comprises a pair of ophthalmic corrective lenses, wherein the display system comprises a light-guide optical element embedded into one of the lenses, and wherein the selective optical filtering means comprise a high-reflection coating provided at the front of the lens in which the light-guide optical element is embedded, wherein the high-reflection coating is such that:
  in order to at least partially hide said display system from the view of an outside observer:
    R1≥R2, within the visible wavelength range or at least a part thereof, for each incidence angle, with 5%≤R1≤97%;
  or
  in order to at least partially hide said display system and the information content displayed by said display system from the view of an outside observer:
    R1≥average (R2;E), preferably R1≥max (R2;E), within the visible wavelength range or at least a part thereof, for each incidence angle, for an incident light with a light intensity level superior or equal to that of the light emitted by the see-through element, with 5%≤R1≤97%;
  wherein
  R1: reflection rate of incident light stemming from the wearer's environment, on the front side of the high-reflection coating, R2: reflection rate of incident light stemming from the wearer's environment, by the see-through element;

E: light intensity directly emitted by the see-through element towards the environment of the wearer.

Uses

According to another aspect, the present invention provides the use of selective optical filtering means in a see-through head mounted device for a wearer, wherein the device comprises:

a display system for the display and visualization of computer-generated information content by the wearer and a see-through element intended to be positioned in front of one or both eyes of the wearer, through which the wearer can visualize a visual field from the environment of the wearer, wherein the selective optical filtering means are for at least partially hiding said display system from the view of an outside observer, while retaining see-through properties for the wearer's visual field, and/or at least partially hiding the information displayed by display system from the view of an outside observer, while retaining see-through properties for the wearer's visual field.

According to another aspect, the present invention provides the use of selective optical filtering means for improving the aesthetics and/or the level of display confidentiality afforded by a see-through head-mounted display device.

Methods

According to another aspect, the present invention provides a method for providing a see-through element intended to be fitted in a see-through head-mounted device for a wearer, comprising the steps of:

(i). Selecting a device frame and a display system for the display and visualization of computer-generated information content by the wearer, (ii). Selecting a see-through element, such as an ophthalmic lens, wherein said see-through element is intended to be fitted onto said device frame, (iii). Determining:

(iii-a) one or more wavelength(s) rendering the display system visible from the point of view of an outside observer, and/or (iii-b) one or more wavelength(s) of the emission spectrum of the light source of the display system, and (iii-c) optionally, the location of the display system relative to the see-through element, once the see-through element is fitted onto the frame, (iv). Selecting selective optical filtering means that are capable of at least partially reflecting at least one of the wavelengths determined at step (iii-a), and/or capable of at least partially blocking at least one of the wavelengths determined at step (iii-b), while retaining the see-through properties of the see-through element, (v). Manufacturing a see-through element as selected at step (ii), wherein said manufactured see-though element comprises selective optical filtering means as selected at step (iv), for example taking into account the location determined at step (iii-c).

DETAILED DESCRIPTION OF THE INVENTION

Head-Mounted Display Devices

In one aspect, the present invention provides a see-through head-mounted device for a wearer, comprising a display system and a see-through element.

Head-mounted display devices (HMDs) are known in the art. Such devices are to be worn on or about the head of a wearer, including helmet-mounted displays, optical head-mounted displays, head-worn displays and the like. They include a display system. The display system can comprise optical means for displaying (computer-generated) information content for visualization by the wearer. The HMD can be a see-through device, in that it can provide for the display of computer-generated information content, advantageously with the superimposed visualization of computer-generated information content and of a 'real-life' vision field. The display system can also comprise a light-guide optical element. Said light-guide optical element can be comprised in a casing affixed to a frame (for example a pod) and/or in the frame and/or in the see-through element and/or on the see-through element and/or in a contactless position situated in front of the see-through element (i.e. without mechanical contact between the light-guide optical element and the see-through element). The light-guide optical element can have see-through properties.

The HMD may be monocular (single eye) or binocular (both eyes).

The HMD of the invention is see-through. It comprises at least one see-through element. The see-through element can be arranged so that the wearer can visualize 'real-life' views, scenes, objects, etc. The see-through element can take various forms. It can be one or more lenses fitted onto a frame. The see-through element can be other than an add-on element, for example other than a removable element that can be affixed to and detached from a regular HMD frame.

The HMD of the invention can take various forms, including spectacles, masks such as skiing or diving masks, goggles, etc. The HMD may comprise one or more lenses, such as ophthalmic lenses. Said lenses can be selected from corrective lenses, such as prescription lenses.

Figure 1:
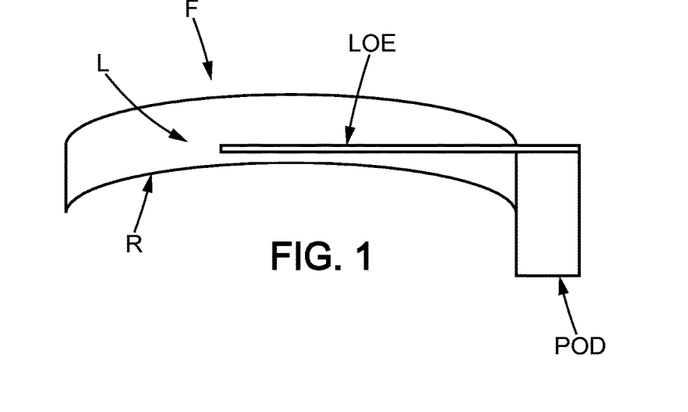
FIG. 1 shows a schematic representation of part of an illustrative HMD.
Figure 2:
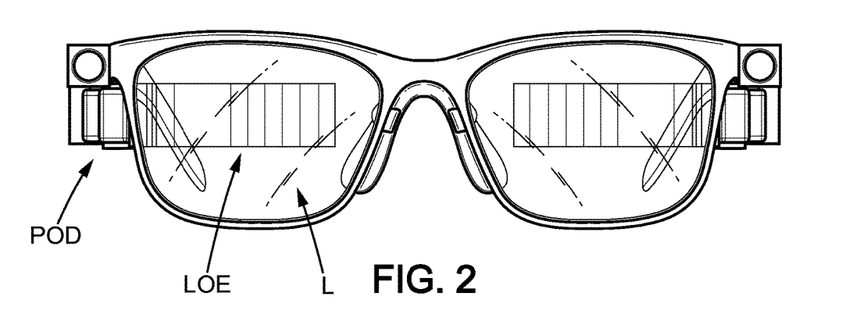
FIGS. 2-3 and 7-8 show partial views of an illustrative HMD comprising selective optical filtering means in accordance with the present invention, wherein the HMD is a pair of smart glasses and wherein at least part of the display system is hidden from the view of an outside observer.

In some embodiments, the HMD is a pair of spectacles provided with lenses, wherein one or both of the lenses comprise a Light-guide Optical Element LOE. One lens or both lenses may be corrective lenses. The HMD generally comprises a casing (pod). Said pod can be a housing that contains optical and electronic components capable, in conjunction with the LOE, of generating (providing) a virtual display. The pod can comprise a light source or an image source such as a mini projector. The light source can emit light in one or more wavelengths. An example of a lens L comprising a LOE is shown at FIG. 1. The lens L has a front face F facing the 'real world' (environment of the wearer) and a rear face R facing the wearer. The LOE is embedded within the lens L. The pod (housing or casing) POD is connected to the LOE. Another example is shown at FIG. 2, depicting a partial view of a HMD showing a light-guide optical element LOE embedded in a lens L, wherein the LOE is connected to a casing POD that is part of the display system of the HMD.

In some embodiments, the see-through head-mounted device is a pair of eyeglasses, the see-through element comprises a pair of ophthalmic corrective lenses, the display system comprises a light-guide optical element embedded into one of the lenses, and the selective optical filtering means (e.g. high-reflection coating) are provided at the front of the lens in which the light-guide optical element is embedded. For example, the selective optical filtering means (e.g. high-reflection coating) are provided in/on the lens in such a way that the LOE is situated between the eye of the wearer and the selective filtering means. For example, the selective filtering means are disposed on the front surface of the lens, or between the embedded LOE and the front surface of the lens, including selective optical filtering means located on the outer front surface of the lens and/or selective optical filtering means located between the LOE and the outer front surface of the lens.

Advantageously according to the invention, the see-through element comprises an embedded LOE and the selective optical filtering means can be used for hiding at least partially said LOE; and/or the display system comprises a pod and the selective optical filtering means can be used for hiding at least partially said pod.

Selective Optical Filtering Means

According to the invention, the see-through element comprises selective optical filtering means. The selective optical filtering means are configured to at least partially hide said display system (pod and/or embedded LOE) and/or the information content displayed by said display system from the view of an outside observer, while retaining see-through properties for the wearer's visual field.

Selective optical filtering means are known in the art. They comprise absorption filtering means, interferential filtering means and combinations thereof. The selective optical filtering means may comprise one or more absorption filtering means and/or one or more interferential filtering means.

In some embodiments, the selective optical filtering means can comprise a dye and/or pigment configured to inhibit transmission by absorption.

In one embodiment, the selective optical filtering means can comprise interferential filtering means configured to inhibit transmission of at least one (selected range of) wavelength(s) of incident light, incident on at least one zone of a surface of the see-through element, within a first selected range of angles of incidence. The interferential means may be an alternative to or in addition to absorptive filtering means. In general terms, interferential filtering means rely on the Bragg theory, and can be selected from thin films, thick films, multilayers, Rugate structures, holography gratings, photonic crystals, liquid crystal technology, including cholesteric crystals and blue phases, etc. and combinations thereof.

Examples of holographic recording are given in the document "*Holographic Imaging*" by Stephen A. Benton and V. Michael Bove, Wiley-Interscience, 2008. An example of a process for the fabrication of a holographic device by making a reflection hologram is disclosed in U.S. Pat. No. 4,942,102.

Examples of photonic bandgap structures and manufacturing processes are provided:

in 1D, in *Nature Photonics* Vol. 1 N°. 8-*August: P-Ink Technology: Photonic Crystal Full-Colour Display*, by André C. Arsenault, Daniel P. Puzzo, Ian Manners & Geoffrey A. Ozin in 2D, in Mei Zhou et al., *Fabrication of two-dimensional infrared photonic crystals by deep reactive ion etching on Si wafers and their optical properties, Solid State Communications* 132, 503 (2004) with the description of reaction ion etching process; and in H. Masuda, et al., *Photonic band gap in anodic porous alumina with extremely high aspect ratio formed in phosphoric acid solution, Japanese Journal of Applied Physics,* 39, L1039 (2000) with the description of aluminium oxide films.

in 3D, in S. John, *Photonic Bandgap Materials*, C. Sokoulis, Ed. Dordrecht: Kulwer Academic Publishers (1996) where colloidal suspensions of opal glass spheres are disclosed. Bragg diffraction of light within colloidal crystals gives rise to a stop-band filter.

Cholesteric liquid crystals are liquid crystals with a helical structure. They are usually composed of nematic liquid crystals with a chiral dopant. Manufacturing methods are for instance disclosed in WO 2014/024764 or US 2002/113937.

Blue phase is a particular state appearing when cooling down chiral nematics from the isotropic state. Blue phase has a highly symmetric molecular structure. Methods of forming a liquid crystal blue phase are provided in TW 201336975.

According to the invention, the selective optical filtering means can be any optical filtering means that have an effect on whole or part of the visible range (380-780 nm). The selectivity of the optical filtering means can refer to the spectral properties (wavelength/s) and/or to the angle of incidence of the light.

In some embodiments, the selective optical filtering means can be configured to selectively inhibit (block) transmission, through the see-through element, of at least one wavelength or at least one selected range of wavelengths of incident light in the visible light spectrum (or in any sub-spectrum thereof) at a suitable inhibition rate. By way of example, suitable inhibition rates include rates of at least 30%, at least 25%, at least 20%, at least 15%, at least 10% or at least 5%. As used herein filtering means "selectively inhibit" one wavelength or a range of wavelengths if the filtering means inhibit at least some transmission of one or more wavelengths within the range, while having little or no effect on the transmission of visible wavelengths outside the range, unless specifically configured to do so. The term rejection rate or inhibition rate or degree of inhibition refers to the percentage of incident light within one or more selected ranges of wavelengths which is prevented from being transmitted. The parameter range of wavelengths or bandwidth is defined as the Full Width at Half Maximum (FWHM). The selectivity can also be defined according to the angle of incidence of the wavelengths of interest.

In some embodiments, the selective optical filtering means can be configured to selectively inhibit transmission, through the see-through element, of at least one selected range of wavelengths of incident light in the visible light spectrum at a suitable inhibition rate, the selective optical filtering means being further configured to transmit at a suitable rate the incident light of the visible spectrum outside the at least one selected range of wavelengths, so that the see-through element retains see-through properties for the wearer. By way of example, suitable inhibition rates include rates of at least 30%, at least 25%, at least 20%, at least 15%, at least 10% or at least 5%. By way of example, suitable transmission rates include rates of at least 16%, at least 12%, at least 10%, at least 8%, or at least 3%.

In some embodiments, the selective optical filtering means can comprise first and second selective optical filtering means, the first selective optical filtering means being configured to inhibit a first range of wavelengths, and the second selective optical filtering means being configured to inhibit a second range of wavelengths having a bandwidth. In this way a selective dual band filter is provided for selectively inhibiting light in a narrow band of wavelengths centered on a first wavelength; and in a narrow band of wavelengths centered on a second wavelength.

In some embodiments, the selective optical filtering means can be interposed between two layers of the see-through element or be disposed on one of the surfaces of the see-through or a part thereof. Where the see-though element is a lens, the selective optical filtering elements can be embedded in the lens and/or disposed on the front surface and/or be disposed on the rear surface of the lens.

In some embodiments, the selective filtering means can be split between two selective filtering means, each interposed between different layers of the see-through element, each disposed on different surfaces of the see-through element or part thereof, or one interposed between two layers and one disposed on a surface of the see-through element. For example, a lens may be provided with a standard first selective filter and a second customized selective filter may then be added according to the desired requirements.

The skilled person possesses general knowledge in the field of optical filtering means. The skilled person can select or determine suitable selective optical filtering means for implementing the present invention. For example, the skilled person can determine suitable selective optical filtering means such as a high-reflection coating capable of selectively reflecting at least one of the wavelengths that, in the absence of said coating, render the display system visible from the point of view of an outside observer. Indeed, based upon a given display system in the HMD, the skilled person can determine the wavelength(s) or range of wavelengths of interest and select corresponding suitable filtering means. High-reflection coatings include coatings such as flash mirrors including multilayered structures of a stacking of $SiO_2$ and $ZrO_2$ layers, for example $SiO_2/ZrO_2/SiO_2$ multilayers.

According to the invention, the high-reflection coating may be such that:
in order to at least partially hide said display system from the view of an outside observer:
$R1 \geq R2$, within the visible wavelength range or at least a part thereof, for each incidence angle, with $5\% \leq R1 \leq 97\%$;
or
in order to at least partially hide said display system and the information content displayed by said display system from the view of an outside observer:
$R1 \geq$ average $(R2;E)$, preferably $R1 \geq \max(R2;E)$, within the visible wavelength range or at least a part thereof, for each incidence angle, for an incident light with a light intensity level superior or equal to that of the light emitted by the see-through element, with $5\% \leq R1 \leq 97\%$;
wherein
R1: reflection rate of incident light stemming from the wearer's environment, on the front side of the high-reflection coating,
R2: reflection rate of incident light stemming from the wearer's environment, by the see-through element;
E: light intensity directly emitted by the see-through element towards the environment of the wearer.

Figure 10:
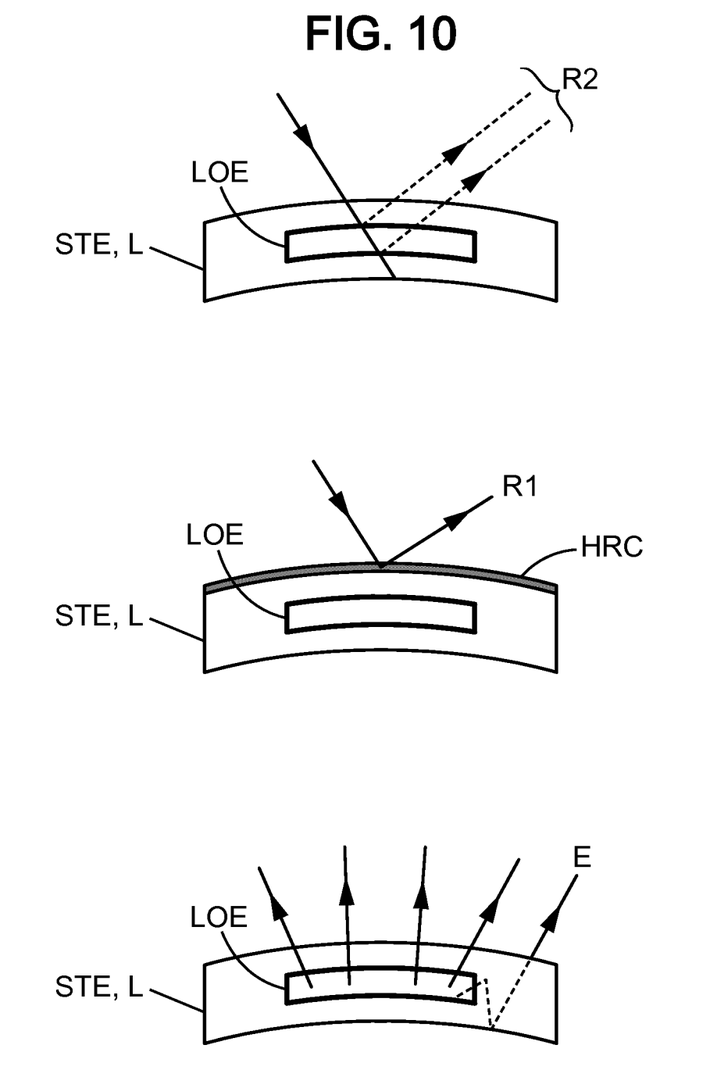
FIG. 10 illustrates the light stemming from the environment (R1, R2) and the light emitted by the light-guide optical element (LOE) towards the environment.

The definitions for R1, R2 and E are illustrated on FIG. 10, wherein STE: see-through element, L: ophthalmic lens, LOE: light-guide optical element, HRC: high-reflection coating. R1 and R2 refer to the light stemming from the wearer's environment; it may be natural or artificial light. E refers to the light emitted by the LOE towards the environment, which includes towards the outside viewing scene for the wearer and thus includes a possible outside observer.

Similarly, the skilled person can determine suitable filtering means that are configured to at least partially hide the information content displayed by said display system from the view of an outside observer, while retaining see-through properties for the wearer's visual field. For example, based upon a given display system, the skilled person can determine the relevant wavelength(s) or range of wavelengths, and identify suitable selective optical filtering means, such as optical filter(s) that blocks at least one wavelength of the emission spectrum of the light source of the display system.

Selective Filtering Means that can be Activated Upon Command

According to the invention, the selective optical filtering means can be activable. This includes selective optical filtering means that can be commanded to be 'on' or 'off', means that can be controllable in absorption and/or means that can be spectrally controllable. The command or control can be automatic and/or upon demand from the wearer. The command or control can be active or passive.

When the selective optical filtering means can be commanded to be 'on' or 'off', they can be controlled through switching means, for example with an electro-shutter.

In some embodiments, the selective optical filtering means are controllable in absorption, preferably the selective optical filtering means are controlled by a synchronization with the emission pattern and/or intensity of the light source of the display system.

When the selective optical filtering means are controllable in absorption, they can be controlled through synchronizing means. For example, synchronization can be performed with respect to the emission pattern and/or the intensity of the light source of the display system. When the selective optical filtering means are spectrally controllable, they can be controlled through synchronizing means. For example, synchronization can be performed with respect to the emission spectrum of the light source of the display system.

The skilled person can implement suitable controllable selective optical filtering means, based on the common knowledge in the field of filtering means.

For example, suitable filtering means can be implemented in a polymer-stabilized device. This can be achieved by taking into account the fact that the Bragg reflected color of a cholesteric liquid crystal (CLC) or blue phase can be switched to another one by applying an electric field on the polymer-stabilized device. This is advantageous, because it makes it possible to easily change the properties of the selective optical filtering means (here, change the reflected color of a selective mirror).

Other activable selective optical filtering means can be obtained by relying on the following:
Adjusting the interlayer distance in a multilayer filter,
Adjusting the refractive index in a photonic crystal filter,
Using the intrinsic angular sensitivity of any interferential filter, Using tailored hygroscopic properties of some photonic crystals. This can be achieved by stacking various organic/inorganic layers. For example it is possible to implement fast responsive polymeric humidity sensors from a series of self-assembled poly(styrenesulfonate-methylbutylene) (PStS-b-PMB) block copolymers with tailored hygroscopic properties. Under different humidity, the PStS-b-PMB thin films display discernible reflective color changes covering almost entire visible light regions from violet (RH=20%) to red (RH=95%).

Uses and Methods of the Invention

According to the invention, the HMD comprises selective optical filtering means. Such means are configured to at least partially hide the display system of the HMD from the view of an outside observer, while retaining see-through properties for the wearer's visual field, and/or configured to at least partially hide the information displayed by display system from the view of an outside observer, while retaining see-through properties for the wearer's visual field. Thus, the selective optical means contribute to improving the aesthetics and/or the level of display confidentiality afforded by the HMD.

The present invention also relates to a method for providing a HMD wherein the see-though element is provided with the relevant selective optical filtering means.

Visual Aspect of the HMD

In addition to possibly at least partially hiding the display system of the HMD, the see-through element can comprise selective optical filtering means that are capable of conferring a specific color to the see-though element, when visualized from the point of view of an outside observer. In such situation, the skilled person can identify and implement suitable selective means. The specific color can be conferred to one part or to the entirety of the see-though element. In the event where the see-through element comprises two ophthalmic lenses, the color can be conferred to one or both lenses.

Spatial Masking of the Display System

In some embodiments, the selective optical filtering means can be selectively provided for a specific surface area of the see-through element. For example the filtering means can be applied according to spatial gradients to the see-through element, for example to the periphery or to one side of the see-through element such as the periphery or one or more edge(s) of the lens(es). In some embodiment, the selective optical filtering means can be provided as a function of the location of the display system relative to the see-through element in the HMD, and/or according to the incident light stemming from the wearer's environment.

The invention is illustrated by the following non-limiting examples.

EXAMPLES

Example 1: Selective Optical Filtering Means: Interferential Filtering Means

In general, interferential filtering means are based on Bragg gratings in which particular wavelengths of light are reflected and other wavelengths are transmitted. This is achieved by adding a periodic variation to the refractive index of a layered structure, which generates a wavelength specific dielectric mirror. The selective interferential filtering means may be configured to inhibit transmission of the incident light by reflection, refraction or diffraction. For example, the selective interferential filtering means may be manufactured using interferential technologies, such as thin-film technology, holographic techniques, interference recordings, or photonic bandgap materials such as liquid crystal technology, including cholesteric crystals.

In one example, the selective interferential filtering means may comprise a thin film device having a plurality of layers with different optical refractive indices. In general, thin-film technology uses multiple layers alternating two or more inorganic or hybrid materials with different refractive indices. Each layer may be provided as a coating deposited on the surface of the see-through element by techniques such as sputtering, vacuum evaporation or physical or chemical vapor deposition. Such technology is used for anti-reflective layers on goggles, spectacles or eyeglasses and transparent optical surfaces.

In another example, the selective interferential filtering means may comprise a photonic bandgap material, such as for example chlolesteric liquid crystal. Use of chlolesteric crystals enables an electrically controllable filter to be devised. In order to obtain a reflection of >50% two layers may be used. The chlolesteric liquid crystals may be provided in the form of at least one sealed layer of liquid or gel on the first surface of the optical substrate. Photonic Crystals are periodical arrangements of metallic or dielectric objects layers that can possess a range of forbidden wavelengths, the so-called photonic bandgap (PBG), analogous to electronic bandgaps in semiconductor materials. The geometry of the periodic pattern and the material properties of the substrate determine the photonic band structure, i.e. the dispersion.

In another example, the selective interferential filtering means may be configured as an interference grating device, arranged such that the selected range of angles of incidence is centered on an angle of incidence substantially normal to the interference patterns of the interference grating.

In another example, the selective interferential filtering means may be configured to inhibit the transmission of wavelengths in two target wavelength bands. Specific configuration of the selective interferential filter to provide narrow bandwidths enables dual band selective interferential filters to be used. Dual band interferential filtering may be provided by using two different interferential filters inhibiting transmission in different target wavelength bands or by a single interferential filter configured to inhibit transmission in two different target bands of wavelengths.

Example 2: Selective Optical Filtering Means: High-Reflection Coating

The high-reflection coating according to the invention can be in the form of a flash mirror, for example a neutral and transparent flash mirror. In some embodiments, this can be achieved by providing a stacking of SiO2 and ZrO2 layers, for example by providing a SiO2/ZrO2/SiO2 stacking. Such high-reflection coating meets the requirements for values of R1, R2 and E as described herein.

Examples are disclosed in U.S. Pat. No. 8,534,833. The skilled person can provide such stacking (multilayered coating). The number and alternation of layers can be modified as is known in the art. For instance: SiO2 80 nm-ZrO2 52 nm-SiO2 21 nm. Indices are as follows SiO2 1.48-ZrO2 2.00. A flash mirror can be prepared using a vacuum evaporation device, e.g. of the type BAK 760 retrofit Physimeca. Three layers can be deposited as follows (SiO2, ZrO2 and SiO2):

| Stage | Rate (nm/s) | Observations |
|---|---|---|
| Pumping | | Start pressure: IPC = 2.0.10−5 mbar |
| IPC | | Standard conditions: 2'/1 A-100 V |
| Silica 0 or Q0 | 3 | |
| Zirconia or Z | 2 | Pressure O2 = 7.10−5 mbar |
| Silica 1 ou Q1 | 2 | |
| Top Coat: OF110 | 0.4 | Evaporation by Joule effect |
| Venting | | |

Example 3: Selective Optical Filtering Means: Color-Tunable Mirror

Electrically Tunable Rejected Color in Polymer-Stabilized Cholesteric Liquid Crystal The electric-field-induced color change in cholesteric liquid crystals has been evidenced since the landmark papers of W. J. Harper, Molecular Crystals, 1, p. 325 (1965) and F. Kahn, Phys. Rev. Lett, 24, p. 5 (1970). Nevertheless, a dramatic loss in reflectance is observed when applying an increasing voltage. In order to retain more layers of the planar state and to have a better resistance against voltage, a small amount of polymer network is added in the cholesteric liquid crystal. The reflected color can be electrically tuned by both amplitude and frequency modulation.

By increasing the amplitude of the electric field, the reflected color is blue-shifted because of the pitch tilting and squeezing. By increasing the frequency of the electric field, the reflected color is red-shifted because of the change in dielectric anisotropy. This advantageously provides a reversible color rejection for both modulation types.

Electrically Tunable Rejected Color in Polymer-Stabilized Blue Phase Liquid Crystal Blue Phase liquid crystals have been known to exist in a small temperature range. Recently, the temperature range was broadened by polymerizing a small amount of monomer in a blue phase to stabilize the cubic lattice against temperature variation. When the electric field is small (not strong enough to induce a phase transition to a helical state), a lattice distortion may be observed (electrostriction—electro-mechanical effect). The electric field interacts with the local dielectric anisotropy of the blue phase.

The incorporation of polymer in a blue phase liquid crystal helps in the stabilization of the structure in response to the electric field and a wider range of electric field can be advantageously used.

The polymer stabilized blue phase liquid crystal demonstrates a red-shift in the reflection spectra in response to the electric field.

According to the embodiment, it is advantageously quite easy to cover the whole visible spectrum range (blue, green, red) by applying various electric field. This advantageously provides for a reversible color rejection.

Further, according to this embodiment, it is possible to achieve narrower rejected bandwidths with blue phase than with CLC (as per above).

Example 4: Selective Optical Filtering Means: Spatial Distribution

This example illustrates options for the spatial distribution of the selective optical filtering means within the bulk of the see-through element and/or on a surface of the see-through element.

Full Hiding of the LOE

Figure 3:
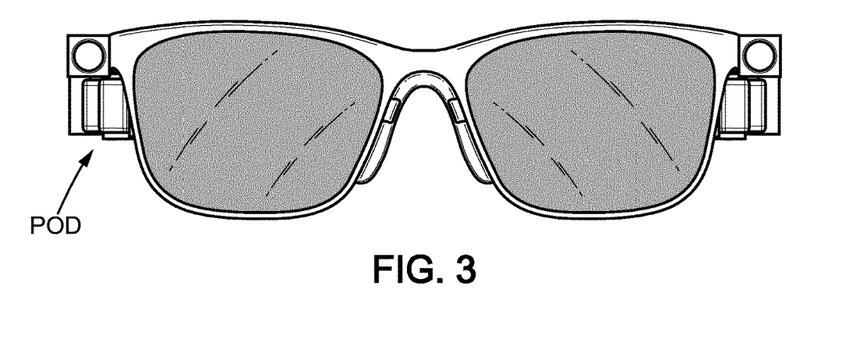

In one example, the selective optical filtering means are provided in such a way that part of the display system, such as the LOE, is fully covered by the optical filtering means and so hidden or partially hidden from the view of an outside observer. For instance, the selective optical filtering means can be provided over the entire surface of the see-though element, for example on the front surface of an ophthalmic lens. The selective optical filtering means can also be provided within the bulk of the see-through element in such a way that the hiding effect is effective over the entire surface of the see-though element. This is illustrated by FIGS. 2 and 3. The entire surface of the lens L is provided with selective optical filtering means in the form of a coating that can reflect or absorb the relevant wavelengths, so that the LOE is entirely hidden from the view of an outside observer. The device of FIG. 2 is shown with one LOE per lens, but it is also envisioned that only one of the two lenses is provided with a LOE.

Partial Hiding of the Casing (Pod)

In one example, the selective optical filtering means can be provided in such a way that part of the casing (pod) is hidden from the view of an outside observer. Corresponding spatial distributions of the selective filtering means within the bulk of the see-through element and/or on the front and/or rear surface of the see-through element are shown in FIGS. 4-8. Where the HMD is a pair of spectacles (smart glasses), for aesthetics reasons, the distribution of the selective optical filtering means can be symmetric between the two lenses.

Figure 4:
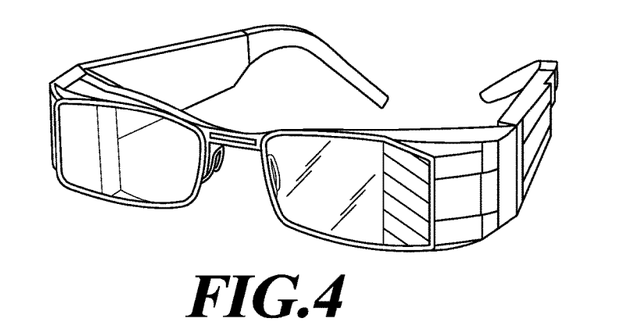
FIGS. 4-6 show possible spatial distributions of selective optical filtering means on a HMD in accordance with the present invention, wherein at least part of the display system is hidden from the view of an outside observer.

FIG. 4 illustrates a situation where the HMD is for monocular display. Selective optical filtering means are present in the portion of a lens marked with hatching. This corresponds to 'front' face of the pod.

Figure 5:
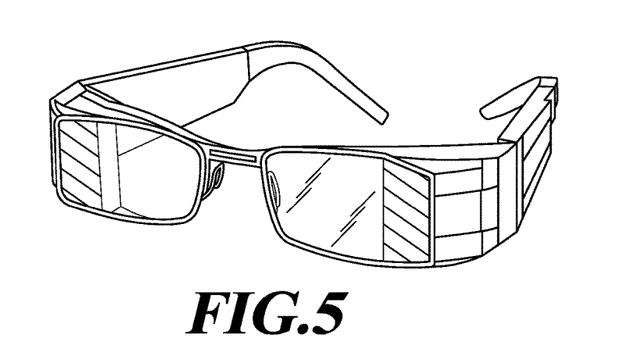

FIG. 5 illustrates a situation where the HMD is monocular, wherein selective optical filtering means are provided on both lenses (shown with hatching).

Figure 6:
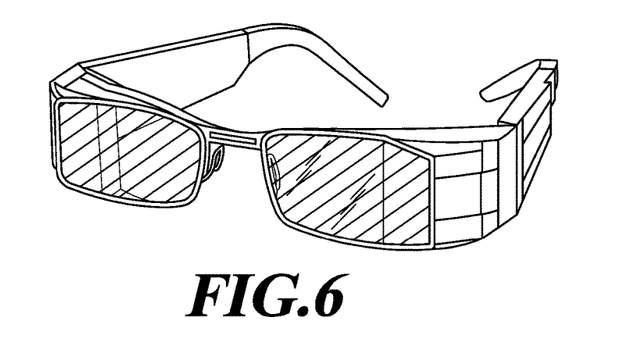

FIG. 6 illustrates a situation where the HMD is monocular, wherein selective optical filtering means are also provided over the entire surface of both lenses (shown with hatching).

Figure 7:
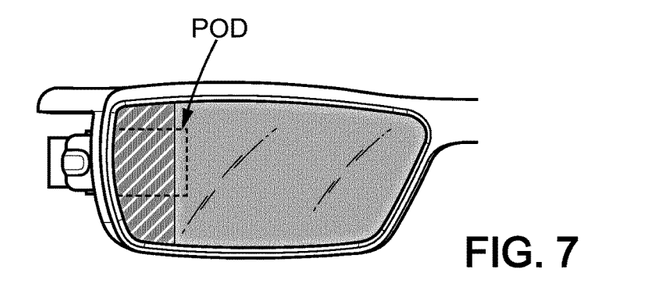
Figure 8:
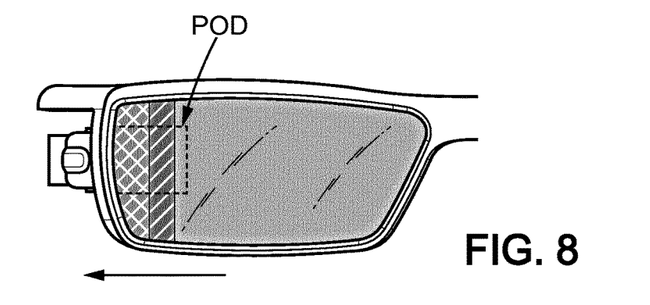

FIGS. 7-8 show partial views of an HMD wherein different sections (zones) of the see-though element can be provided with different selective optical filtering means as shown with hatching. The arrow on FIG. 8 shows a possible gradient that can be applied for the spatial distribution of the selective optical filtering means.

In FIGS. 4-8, the front surface of the pod is totally or partially hidden from the view of an outside observer.

Example 5: Selective Optical Filtering Means: Preserving Confidentiality

Figure 9:
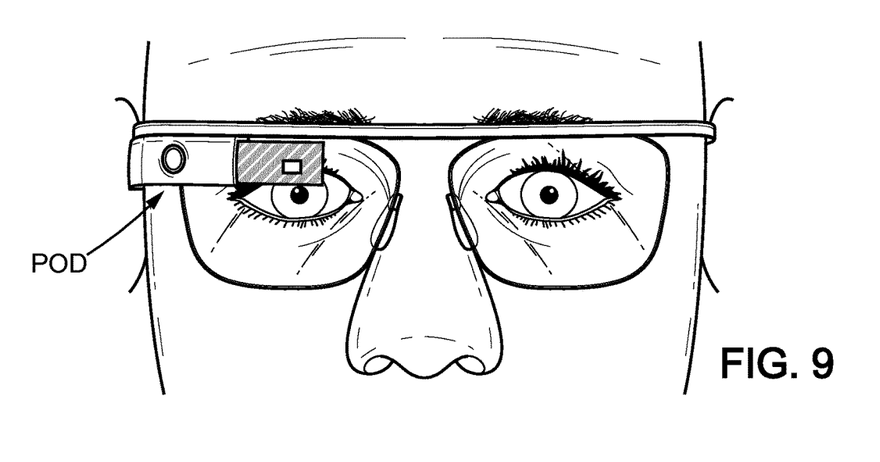
FIG. 9 illustrates a HMD wherein selective optical filtering means are provided so as to preserve confidentiality of the information content displayed by the HMD.

The selective optical filtering means can be configured so as to absorb one or more wavelengths of the light source of the display system. This is illustrated at FIG. 9. The white square spot (content display) may be visible from an outside observer. Selective optical filtering means can be applied (hatching) so as to absorb all or part of the light signal emitted by the display system of the HMD.

The invention claimed is:
1. A see-through head-mounted device for a wearer, comprising:
 a display system for display and visualization of computer-generated information content by the wearer; and a see-through element configured to be positioned in front of at least one eye of the wearer, through which the wearer visualizes a visual field from an environment of the wearer;

wherein the see-through element comprises a selective optical filtering means configured to at least partially hide the display system and the information content displayed by the display system from a view of an outside observer, while retaining see-through properties for the visual field of the wearer, and wherein, to at least partially hide the display system, the selective optical filtering means comprises a high-reflection coating configured to selectively reflect at least one wavelength that, in the absence of the high-reflection coating, renders the display system visible from a point of view of the outside observer, wherein the see-through head-mounted device is a pair of eyeglasses, and the see-through element comprises a pair of ophthalmic corrective lenses;

wherein the display system comprises a light-guide optical element embedded into one of the pair of ophthalmic lenses;

wherein the selective optical filtering means comprises a high-reflection coating provided at the front of the lens in which the light-guide optical element is embedded, wherein the high-reflection coating is such that:

to at least partially hide the display system from the view of the outside observer:

R1 is greater than or equal to R2, within a visible wavelength range or at least a part thereof, for each incidence angle, with 5 percent being less than or equal to R1 and R1 being less than or equal to 97 percent; and to at least partially hide the display system and the information content displayed by the display system from the view of the outside observer:

R1 is greater than or equal to at least one of an average of R2 and E and a maximum of R2 and E within the visible wavelength range or at least a part thereof for each incidence angle, for an incident light with a light intensity level greater than or equal to that of a light emitted by the see-through element, with 5 percent being less than or equal to R1 and R1 being less than or equal to 97 percent;

wherein:

R1 comprises a reflection rate of the incident light stemming from the environment of the wearer on the front side of the high-reflection coating;

R2 comprises a reflection rate of the incident light stemming from the environment of the wearer by the see-through element; and E comprises a light intensity directly emitted by the see-through element towards the environment of the wearer.

2. The see-through head-mounted device of claim 1, wherein the high-reflection coating comprises a one-way mirror, a dielectric mirror, holographic gratings, photonic bandgap structures, thick film layers, thin film layers, cholesteric liquid crystals.

3. The see-through head-mounted device of claim 1, wherein the selective optical filtering means comprises absorption filters or interference filters.

4. The see-through head-mounted device of claim 1, wherein the selective optical filtering means is configured to confer a specific color to the see-though element, when visualized from a point of view of the outside observer.

5. The see-through head-mounted device of claim 1, wherein the selective optical filtering means is selectively provided for a specific surface area of the see-through element.

6. The see-through head-mounted device of claim 1, wherein the selective optical filtering means is activable.

7. The see-through head-mounted device of claim 6, wherein the selective optical filtering means is controllable in absorption.

8. The see-through head-mounted device of claim 1, wherein the selective optical filtering means is selectively provided for a specific surface area of the see-through element according to spatial gradients, according to at least one of a location of the display system relative to the see-through element and according to incident light stemming from the environment of the wearer.

9. The see-through head-mounted device of claim 8, wherein the incident light stemming from the environment of the wearer is natural or artificial light.

10. The see-through head-mounted device of claim 1, wherein the selective optical filtering means is configured to selectively reflect incident light stemming from the environment of the wearer.

11. The see-through head-mounted device of claim 1, wherein the display system comprises a light source having an emission spectrum, and wherein the selective optical filtering means comprises an optical filter that blocks at least one wavelength of the emission spectrum.

12. The see-through head-mounted device of claim 7, wherein the display system has an emission pattern, and wherein the selective optical filtering means is controlled by at least one of a synchronization with the emission pattern and an intensity of a light source of the display system.

* * * * *